United States Patent
Noda

(10) Patent No.: US 7,841,197 B2
(45) Date of Patent: Nov. 30, 2010

(54) TORQUE CALCULATION APPARATUS AND TORQUE CALCULATION METHOD OF VARIABLE CAPACITANCE COMPRESSOR

(75) Inventor: Yoshitoshi Noda, Sano (JP)

(73) Assignee: Calsonic Kansei Corporation, Tokyo (JP)

(*) Notice: Subject to any disclaimer, the term of this patent is extended or adjusted under 35 U.S.C. 154(b) by 1417 days.

(21) Appl. No.: 11/249,736

(22) Filed: Oct. 14, 2005

(65) Prior Publication Data
US 2006/0080977 A1 Apr. 20, 2006

(30) Foreign Application Priority Data
Oct. 15, 2004 (JP) .......................... P2004-301773
May 25, 2005 (JP) .......................... P2005-153110

(51) Int. Cl.
F25B 1/00 (2006.01)
F25B 49/00 (2006.01)

(52) U.S. Cl. .................. 62/228.1; 62/129; 62/323.1; 62/244

(58) Field of Classification Search ................. 62/129, 62/228.1, 323.1
See application file for complete search history.

(56) References Cited
U.S. PATENT DOCUMENTS
5,285,649 A * 2/1994 Yamanaka et al. ............ 62/133
5,752,387 A * 5/1998 Inagaki et al. ................. 62/133
6,679,079 B2 * 1/2004 Nagai et al. ................... 62/244
6,725,681 B2 * 4/2004 Adaniya et al. ............ 62/228.5
2002/0170307 A1 * 11/2002 Nishizuka et al. ............. 62/230

FOREIGN PATENT DOCUMENTS
JP 05-099156 A 4/1993
JP 11-170856 A 6/1999
JP 2003-278660 A 10/2003

* cited by examiner

Primary Examiner—Frantz F. Jules
Assistant Examiner—Azim Rahim
(74) Attorney, Agent, or Firm—Foley & Lardner LLP

(57) ABSTRACT

A variable capacitance compressor is provided in a refrigeration cycle of a vehicular air conditioning system. The variable capacitance compressor controls discharge capacity of refrigerant by an external control pulse signal, and can substantially estimate compressor suction side pressure by the external control pulse signal and compressor discharge side pressure. A compressor torque calculator is provided to calculate torque based on evaporator upstream and downstream temperature difference data $\Delta t$, which is a temperature difference between inlet side air temperature of an evaporator and outlet side air temperature of the evaporator, compressor discharge side pressure data Pd, duty ratio data of a control pulse signal, and compressor's number of revolution data.

4 Claims, 12 Drawing Sheets

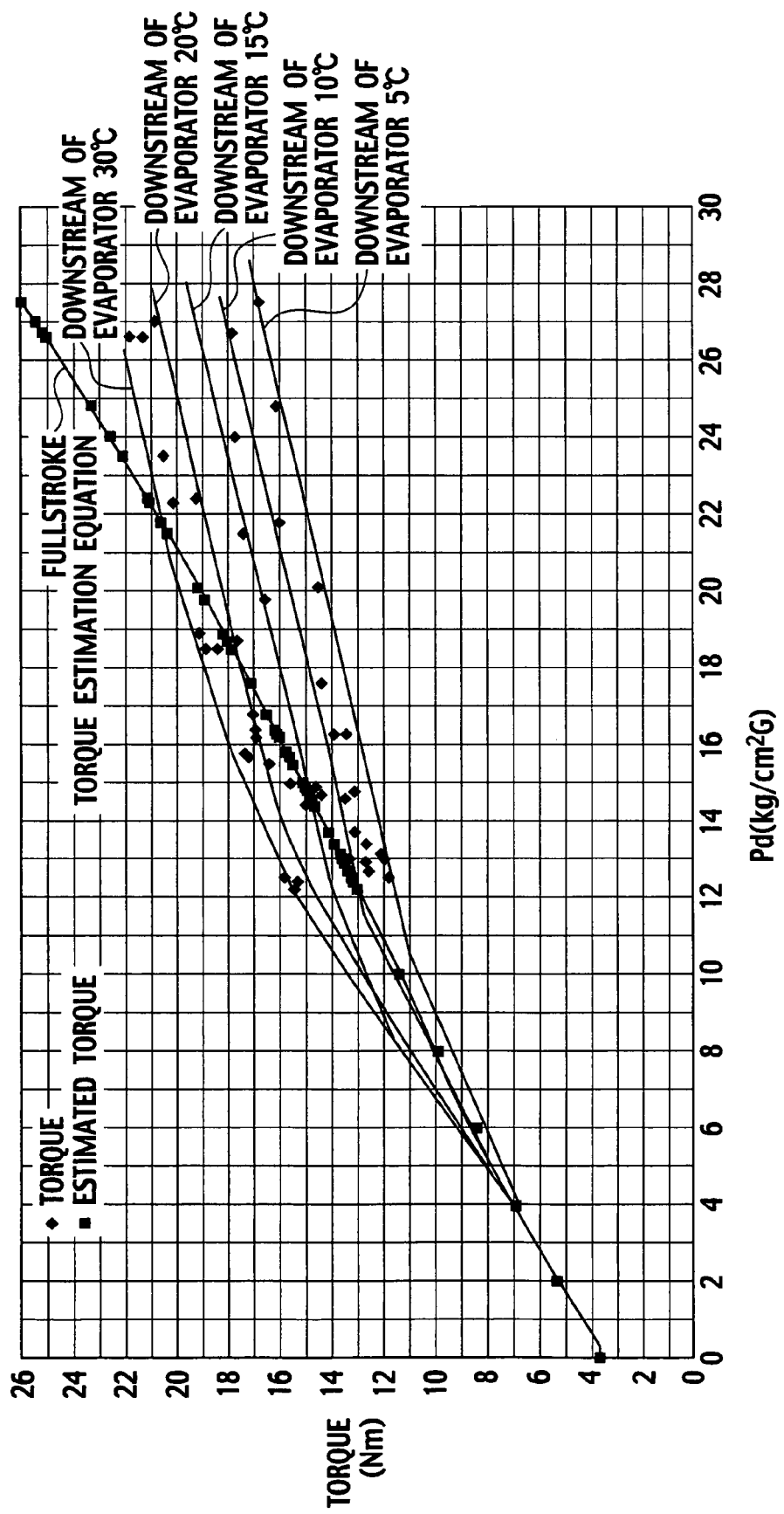

TORQUE CALCULATION APPARATUS AND TORQUE CALCULATION METHOD OF VARIABLE CAPACITANCE COMPRESSOR

BACKGROUND OF THE INVENTION

1. Field of the Invention

The present invention relates to a torque calculation apparatus and a torque calculation method of a variable capacitance compressor provided in a refrigeration cycle of a vehicular air conditioning system.

2. Description of the Related Art

In a variable capacitance compressor of this kind, discharge capacity of refrigerant can be varied by an external control signal to save power. If the discharge capacity of the refrigerant is varied, since load acting on an engine is varied, it is necessary that the engine controller controls the intake airflow (fuel supply amount) to prevent engine stalls and idling of the engine in an idling mode. Since the engine controller performs such a control, it is necessary to recognize torque of the variable capacitance compressor. There are conventionally proposed various torque calculation apparatuses. The present applicant previously proposed a torque calculation apparatus having high estimation precision (Japanese Patent Application Laid-open No. 2003-278660).

The torque calculation apparatus of the variable capacitance compressor includes an interior wind amount calculator which calculates an interior wind amount of air flowing into a passenger room through an evaporator, an evaporator air heat absorption amount calculator which calculates an evaporator air heat absorption amount from variations of the interior wind amount and of enthalpy between upstream and downstream of the evaporator, a refrigerant flow rate calculator which calculates a refrigerant flow rate flowing through the evaporator from variations of the evaporator air heat absorption amount and the upstream and downstream of the evaporator, and a compressor drive torque calculator which calculates torque of the compressor using the calculated refrigerant flow rate.

This torque calculation apparatus can calculate torque with high estimation precision by taking the refrigerant flow rate flowing through the evaporator of the refrigeration cycle into consideration.

SUMMARY OF THE INVENTION

In the conventional torque calculation apparatus, however, when the evaporator air heat absorption amount calculator calculates the evaporator inlet air enthalpy, in order to obtain data, a moisture sensor which detects moisture at the inlet of the evaporator is provided in addition to the existing sensors. Therefore, it is necessary to provide a sensor in addition to a sensor which is normally provided in the vehicular air conditioning system.

Accordingly, it is an object of the present invention to provide a torque calculation apparatus and a torque calculation method of a variable capacitance compressor which can calculate torque with high estimation precision and which do not require a new sensor except an existing sensor which is normally provided in a vehicular air conditioning system by taking the refrigerant flow rate flowing through an evaporator of a refrigeration cycle into consideration.

To achieve the above object, a first aspect of the present invention provides a torque calculation apparatus of a variable capacitance compressor which is provided in a refrigeration cycle of a vehicular air conditioning system, which controls discharge capacity of refrigerant by an external control signal, and which can estimate compressor suction side pressure by the external control signal and compressor discharge side pressure, wherein the torque calculation apparatus comprises a compressor torque calculator which calculates torque based on evaporator upstream and downstream temperature difference data which is a temperature difference between inlet side air temperature of an evaporator and outlet side air temperature of the evaporator, compressor discharge side pressure data, external control signal data, and compressor's number of revolution data.

According to the first aspect of the invention, the fact that the compressor suction side pressure can substantially be specified by the external control signal and the compressor discharge side pressure is utilized, and when the evaporator suction load as the refrigeration cycle load is constant, the refrigerant flow rate and the compressor machine efficiency are obtained as functions of the external control signal and the compressor discharge side pressure. When the evaporator suction load as the refrigeration cycle load is varied, the varied refrigerant flow rate value and the evaporator refrigerant heat absorption amount can be estimated from temperature difference data between the evaporator inlet side air temperature and the evaporator outlet side air temperature. Using these relations, the torque is calculated based on the evaporator upstream and downstream temperature difference data, the compressor discharge side pressure data, the external control signal data and the compressor's number of revolution data. Therefore, since the refrigerant flow rate flowing through the evaporator of the refrigeration cycle is taken into consideration, the torque can be calculated with high estimation precision, and it is unnecessary to newly provide a moisture sensor.

The torque calculation apparatus of the variable capacitance compressor may further include an outside air temperature detector which detects temperature of the outside air, and an inside air temperature detector which detects temperature in a passenger room, the outside air temperature detection value of the outside air temperature detector may be utilized as inlet side air temperature of the evaporator in an outside air introduction mode, and an interior temperature detection value of the inside air temperature detector may be utilized as inlet side air temperature of the evaporator in an inside air circulation mode.

With this configuration, since the temperature difference data which is close to the actual temperature difference is employed for the outside air introduction and the inside air circulation, the estimation precision is enhanced.

In the torque calculation apparatus of the variable capacitance compressor, a constant value may be used as the compressor's number of revolution data.

With this configuration, data to be obtained can be reduced, and it becomes easy to calculate a calculation equation at the time of idling, deceleration, and fuel cut.

The torque calculation apparatus of the variable capacitance compressor may further comprise a memory which stores a torque calculation equation in which the evaporator upstream and downstream temperature difference data, the compressor discharge side pressure data and the external control signal data are variables, and the compressor's number of revolution data is a variable or a constant value, and each data may be input to the torque calculation equation to carry out calculations, thereby calculating the torque.

With this configuration, the amount of data to be stored can be reduced.

The torque calculation apparatus of the variable capacitance compressor may further comprise a memory which stores a torque calculation equation, in which portions of the evaporator upstream and downstream temperature difference data, the compressor discharge side pressure data, the external control signal data and the compressor's number of revolution data are variable terms, and data determined based on the data contents is a constant term, and which stores a data value of the constant term obtained by measurement under various conditions, and data values corresponding to the variable term and the constant term of the torque calculation equation, may be input to carry out calculation, thereby calculating the torque.

With this configuration, since the data of the constant term can be adjusted such that a torque which is close to the actual measurement can be obtained, an estimated torque close to the actual torque can be obtained.

In the torque calculation apparatus of the variable capacitance compressor, a relation of $Tc=A \cdot LN(Pd/\Delta t)+B$ is established, wherein Tc represents torque of the variable capacitance compressor, $\Delta t$ represents evaporator upstream and downstream temperature difference data, Pd represents compressor discharge side pressure data, the compressor's number of revolutions is a constant value, and A and B represent constants determined based on duty ratio which is the external control signal data and the evaporator upstream and downstream temperature difference data, the data value of the constant term may be data obtained by measurement under various conditions of the duty ratio and the evaporator upstream and downstream temperature difference data.

In the torque calculation apparatus of the variable capacitance compressor, when a determining unit which determines whether the variable capacitance compressor is in a maximum capacity control state determines that the variable capacitance compressor is in the maximum capacity control state, the torque may be calculated based on the compressor discharge side pressure data, the compressor's number of revolution data, and the evaporator outlet side air temperature data.

With this configuration, when it is determined that the state is the maximum capacity control state, a torque is calculated based on the compressor discharge side pressure data, the compressor's number of revolution data, and the evaporator outlet side air temperature data, and the estimation precision in the maximum capacity control state is enhanced.

A second aspect of the invention provides a torque calculation method of a variable capacitance compressor which is provided in a refrigeration cycle of a vehicular air conditioning system, which controls discharge capacity of refrigerant by an external control signal, and which can estimate compressor suction side pressure by the external control signal and compressor discharge side pressure, wherein the torque calculation apparatus comprises a compressor torque calculator which calculates torque based on evaporator upstream and downstream temperature difference data which is a temperature difference between inlet side air temperature of an evaporator and outlet side air temperature of the evaporator, compressor discharge side pressure data, external control signal data, and compressor's number of revolution data.

With this configuration, the fact that the compressor suction side pressure can substantially be specified by the external control signal and the compressor discharge side pressure is utilized, and when the evaporator suction load as the refrigeration cycle load is constant, the refrigerant flow rate and the compressor machine efficiency are obtained as functions of the external control signal and the compressor discharge side pressure. When the evaporator suction load as the refrigeration cycle load is varied, the varied refrigerant flow rate value and the evaporator refrigerant heat absorption amount can be estimated from temperature difference data between the evaporator inlet side air temperature and the evaporator outlet side air temperature. Using these relations, the torque is calculated based on the evaporator upstream and downstream temperature difference data, the compressor discharge side pressure data, the external control signal data and the compressor's number of revolution data. Therefore, since the refrigerant flow rate flowing through the evaporator of the refrigeration cycle is taken into consideration, the torque can be calculated with high estimation precision, and it is unnecessary to newly provide a moisture sensor.

In the torque calculation method of the variable capacitance compressor, an outside air temperature detection value may be utilized as inlet side air temperature of the evaporator in an outside air introduction mode, and an interior temperature detection value may be utilized as inlet side air temperature of the evaporator in an inside air circulation mode.

With this configuration, since the temperature difference data which is close to the actual temperature difference is employed for the outside air introduction and the inside air circulation, the estimation precision is enhanced.

In the torque calculation method of the variable capacitance compressor, a constant value is used as the compressor's number of revolution data.

With this configuration, data to be obtained can be reduced, and it becomes easy to calculate the calculation equation at the time of idling, deceleration, and fuel cut.

In the torque calculation method of the variable capacitance compressor, a torque calculation equation in which the evaporator upstream and downstream temperature difference data, the compressor discharge side pressure data and the external control signal data are variables, and the compressor's number of revolution data is a variable or a constant value may be stored, each data may be input to the torque calculation equation to carry out calculations, thereby calculating the torque.

With this configuration, the amount of data to be stored can be reduced.

In the torque calculation method of the variable capacitance compressor, torque calculation equation, in which portions of the evaporator upstream and downstream temperature difference data, the compressor discharge side pressure data, the external control signal data and the compressor's number of revolution data are variable terms, and data determined based on the data contents is a constant term may be stored, a data value of the constant term obtained by measurement under various conditions may be stored, data values corresponding to the variable term and the constant term of the torque calculation equation, may be input to carry out calculation, thereby calculating the torque.

With this configuration, since the data of the constant term can be adjusted such that a torque which is close to the actual measurement can be obtained, an estimated torque close to the actual torque can be obtained.

In the torque calculation method of the variable capacitance compressor, a relation of $Tc=A \cdot LN(Pd/\Delta t)+B$ is established, wherein Tc represents torque of the variable capacitance compressor, $\Delta t$ represents evaporator upstream and downstream temperature difference data, Pd represents compressor discharge side pressure data, the compressor's number of revolutions is a constant value, and A and B represent constants determined based on duty ratio which is the external control signal data and the evaporator upstream and downstream temperature difference data, the data value of the constant term may be data obtained by measurement under various conditions of the duty ratio and the evaporator upstream and downstream temperature difference data.

In the torque calculation method of the variable capacitance compressor, when a determining unit which determines whether the variable capacitance compressor is in a maximum capacity control state determines that the variable capacitance compressor is in the maximum capacity control state, the torque may be calculated based on the compressor discharge side pressure data, the compressor's number of revolution data, and the evaporator outlet side air temperature data.

With this configuration, when it is determined that the state is the maximum capacity control state, a torque is calculated based on the compressor discharge side pressure data, the compressor's number of revolution data, and the evaporator outlet side air temperature data, and the estimation precision in the maximum capacity control state is enhanced.

BRIEF DESCRIPTION OF THE DRAWINGS

FIG. 12 shows an embodiment of the invention, is a diagram of characteristics of compressor discharge side pressure and torque using evaporator outlet side air temperature as parameters.

BEST MODE FOR CARRYING OUT THE INVENTION

An embodiment of the invention will be explained below with reference to the drawings.

FIGS. 1 to 11 show an embodiment to which a torque calculation apparatus and a torque calculation method of a variable capacitance compressor are applied.

Figure 1:
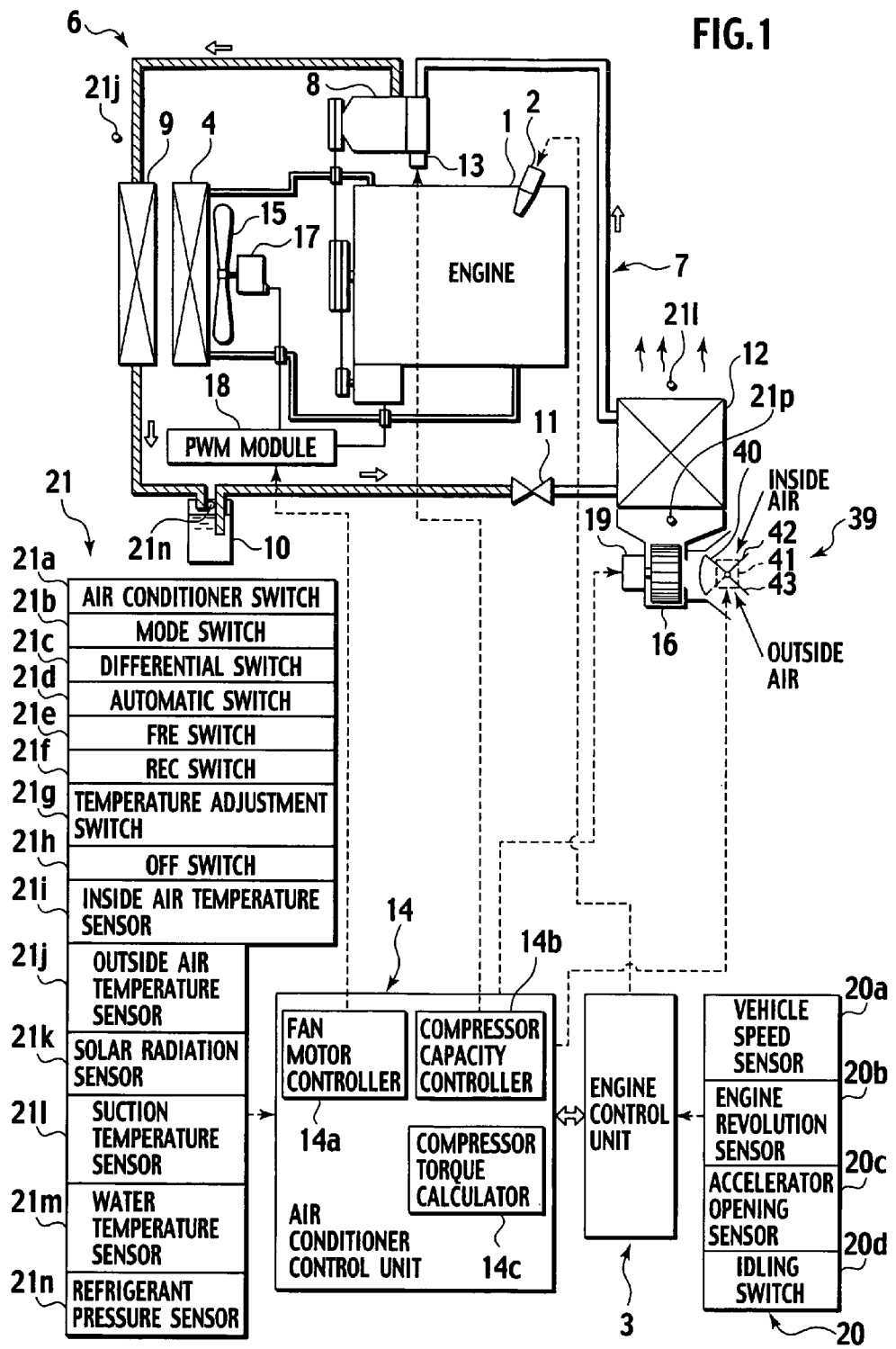
FIG. 1 shows an embodiment of the invention, and is a diagram of a vehicular air conditioning system.

In FIG. 1, an engine 1 includes a fuel injector 2 for injecting fuel. The fuel injector 2 is controlled by a control signal of an engine control unit 3, and the number of revolutions of the engine is varied to a predetermined number of revolutions by the control of the fuel injector 2. A radiator 4 is connected to the engine 1 through a cooling water pipe (no reference numeral is designated).

A refrigeration cycle 7 of a vehicular air conditioning system 6 includes a variable capacitance compressor 8, a condenser 9, a liquid tank 10, a temperature automatic expansion valve 11, an evaporator 12 and a refrigerant pipe (no reference numeral is designated) which connects these elements.

The variable capacitance compressor 8 is driven by rotation of the engine 1, and converts low temperature and low pressure vaporized refrigerant sent from the evaporator 12 into high temperature and high pressure vaporized refrigerant and sends the same to the condenser 9. The variable capacitance compressor 8 includes a control valve 13. The control valve 13 varies discharge capacity of the refrigerant by duty ratio of a control pulse signal which is an external control signal from an air conditioner control unit 14. Details of the configuration of the variable capacitance compressor 8 and the variable capacitance control will be described later.

The condenser 9 is disposed on a front surface of the radiator 4. The condenser 9 cools high temperature and high pressure vaporized refrigerant to a condensation point by wind of running wind or an electric cooling fan 15, and brings the same into high temperature or medium temperature liquefied refrigerant. The condenser 9 then sends the high temperature or medium temperature liquefied refrigerant to a liquid tank 10.

The liquid tank 10 removes moisture or impurities included in the high temperature or medium-temperature liquefied refrigerant, and stores the same so that refrigerant can be supplied smoothly. The stored-liquefied refrigerant is sent to a temperature automatic expansion valve 11.

The temperature automatic expansion valve 11 abruptly expands the high pressure medium temperature liquefied refrigerant, and sends the same to the evaporator 12 as low pressure low temperature nebuousus liquefied refrigerant.

The evaporator 12 vaporizes the nebuousus liquefied refrigerant by absorbing heat of wind sent into the passenger room by a blower fan 16, and brings the same into low pressure low temperature vaporized refrigerant. The low pressure low temperature vaporized refrigerant to the variable capacitance compressor 8.

The electric cooling fan 15 is rotated by driving force of a fan motor 17. The fan motor 17 is driven by a signal obtained by modulating pulse width (PWM) of motor driving voltage from the air conditioner control unit 14 by a PWM module 18.

A suction side of the blower fan 16 is provided with an inside air/outside air switching box 39, an inside air suction port 42 through which inside air which is air in the passenger room is sucked, and an outside air suction port 43 through which outside air which is air outside of the passenger room is sucked. The sucking operations of inside air and outside air can be switched by an inside air/outside air switching door 40 disposed in the inside air/outside air switching box 39.

The blower fan 16 is rotated by the driving force of the blower fan motor 19. As the blower fan 16 rotates, it sucks inside air which is air inside of the passenger room and/or outside air which is air outside of the passenger room, sends the sucked wind to the evaporator 12 under pressure, and sends the cooled air into the passenger room. The blower fan motor 19 is driven by a drive control signal (blower voltages are 5V and 12V) from the air conditioner control unit 14.

The engine control unit 3 is connected to the air conditioner control unit 14 through a two-way communication line. Sensor detection data of an engine control sensor group 20 is input to the engine control unit 3, and the engine control unit 3 controls the engine 1 based on sensor detection data and engine control command. The engine control sensor group 20 includes a vehicle speed sensor 20a, an engine revolution sensor 20b, an accelerator opening sensor 20c, and an idling switch 20d.

The air conditioner control unit 14 is provided therein with a fan motor controller 14a, a compressor capacity controller 14b, and a compressor torque calculator 14c which is a compressor torque calculation apparatus. The fan motor controller 14a controls the operation of the fan motor 17. The compressor capacity controller 14b controls the control valve 13 as described above. The compressor torque calculator 14c calculates torque of the variable capacitance compressor 8 by carrying out the flow shown in FIG. 10. Details of the torque calculation processing will be explained below.

Sensor detection data of the air conditioner control sensor group 21 is input to the air conditioner control unit 14, and the air conditioner control unit 14 controls the variable capacitance compressor 8, the blower fan motor 19 and the like based on the sensor detection data and air conditioner control command. The air conditioner control sensor group 21 is existing sensors which are normally provided in the vehicular air conditioning system 6. The air conditioner control sensor group 21 includes an air conditioner switch 21a, a mode switch 21b, a differential switch 21c, an automatic switch 21d, an FRE switch 21e, an REC switch 21f, a temperature adjustment switch 21g, an OFF switch 21h, an inside air temperature sensor 21i which is inside air temperature detector for detecting the temperature in the passenger room, an outside air temperature sensor 21j which is outside air temperature detector for detecting the temperature of the outside air, a solar radiation sensor 21k, a suction temperature sensor 21l which is outlet side air temperature detector of the evaporator 12, a water temperature sensor 21m, and a refrigerant pressure sensor 21n which detects compressor discharge side pressure of the variable capacitance compressor 8.

The inside air/outside air switching door selects suction of outside air (FRE) or suction of inside air (REC) by the FRE switch (not shown) or the REC switch (not shown), and controls a drive unit 41 based on the air conditioner control command, and switches the inside air/outside air switching door 40.

Figure 2:
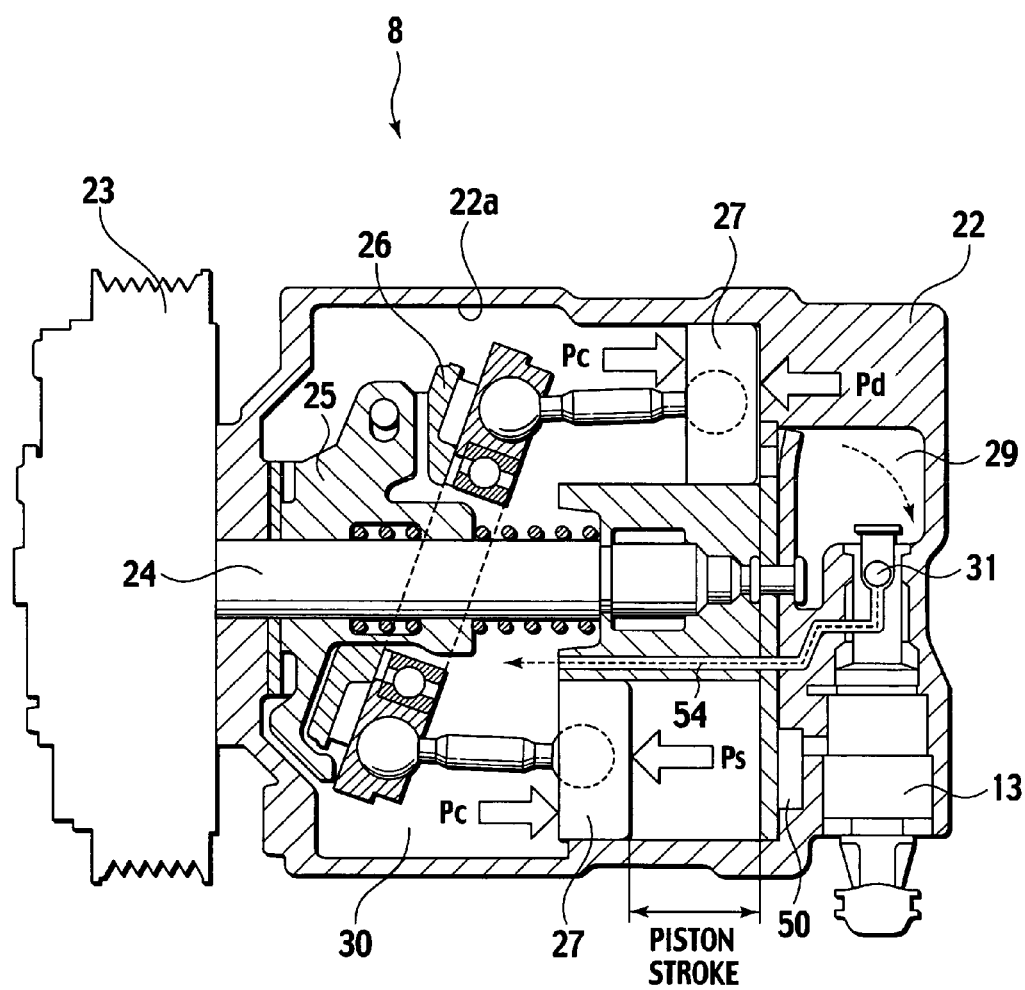
FIG. 2 shows an embodiment of the invention, and is a sectional view of a variable capacitance compressor.

In FIG. 2, the variable capacitance compressor 8 includes a housing 22 formed with a plurality of housing bores 22a in the circumferential direction, a rotation shaft 24 which is disposed at a center position in the housing 22 and rotated by rotation of a pulley 23, a swash plate 26 connected to the rotation shaft 24 through a swash plate drive body 25, a plurality of pistons 27 which reciprocate in each housing bore 22a according to the rotation of the swash plate 26 and which varies the reciprocation stroke using an inclination angle of the swash plate 26, and the control valve 13 which varies the inclination angle of the swash plate 26 by changing the crankcase pressure Pc applied to a back surface of the piston 27 and which controls the discharge capacity of the refrigerant.

The air conditioner control unit 14 calculates target temperature, air-blow amount and the like from target interior temperature set by a passenger and from detection values of the various sensors. At that time, the air conditioner control unit 14 also calculates target evaporator outlet side air temperature and duty ratio of the control valve 13. The control valve 13 controls capacity of the variable capacitance compressor 8 by the calculated duty ratio.

Figure 3:
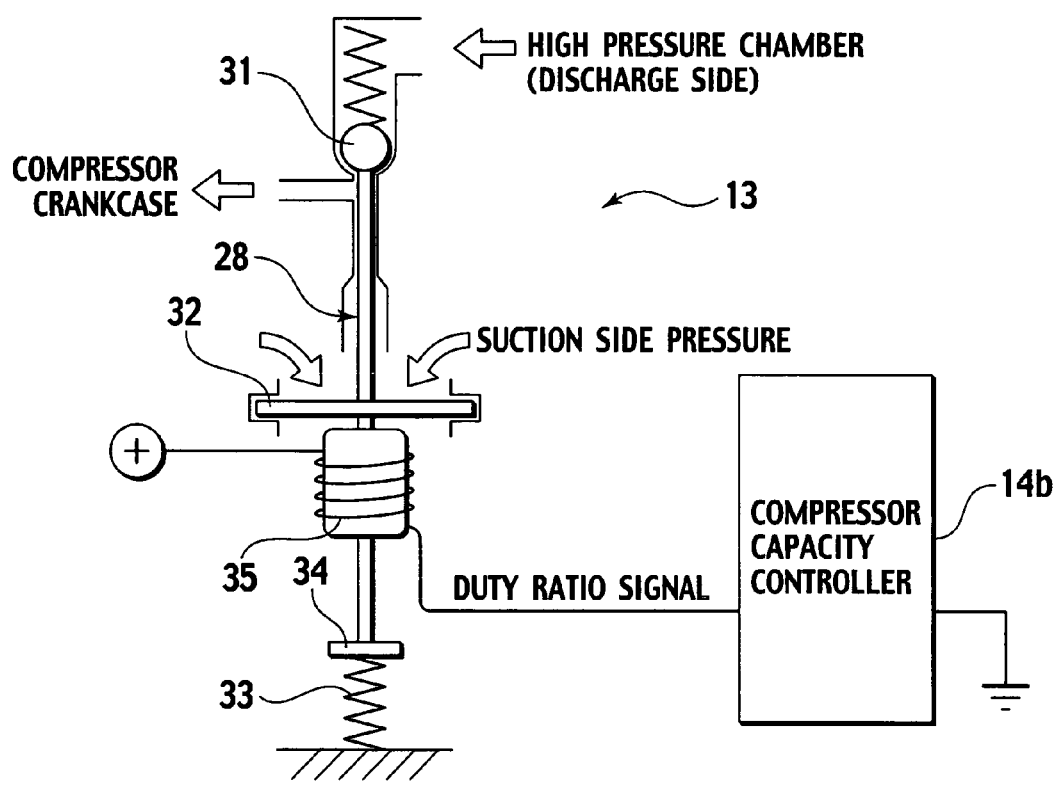
FIG. 3 shows an embodiment of the invention, and is an explanatory view of variable control of capacitance.

As shown in FIG. 3, the control valve 13 includes a control body 28 which is disposed such that it can reciprocate with respect to the housing 22. The control body 28 is integrally provided with a high pressure ball 31 which controls the refrigerant flow rate from the high pressure chamber 29 to the crankcase 30 by a lift amount, a diaphragm 32 to which compressor suction side pressure Ps is applied, and a spring receiver 34 to which spring force of a set spring 33 is applied. The control body 28 receives, in the axial direction, electromagnetic force generated when an electromagnetic coil 35 is energized. The electromagnetic coil 35 is energized by means of duty ratio of a control pulse signal from the air conditioner control unit 14, and an electromagnetic force which is proportional to the duty ratio is applied to the control body 28. With this configuration, the lift amount of the high pressure ball 31 is varied, and the inclination angle of the swash plate 26 is varied by the lift amount of the high pressure ball 31. With this above operation, the discharge capacity of the refrigerant of the variable capacitance compressor 8 is controlled by the duty ratio of the control pulse signal sent from the air conditioner control unit 14 to the control valve 13. Since the variable capacitance compressor 8 controls the discharge capacity of the refrigerant as shown in FIG. 5 by adjusting the refrigerant flow rate from the high pressure chamber 29 to the crankcase 30, the compressor suction side pressure can be substantially specified from the duty ratio and the compressor discharge side pressure.

Figure 5:
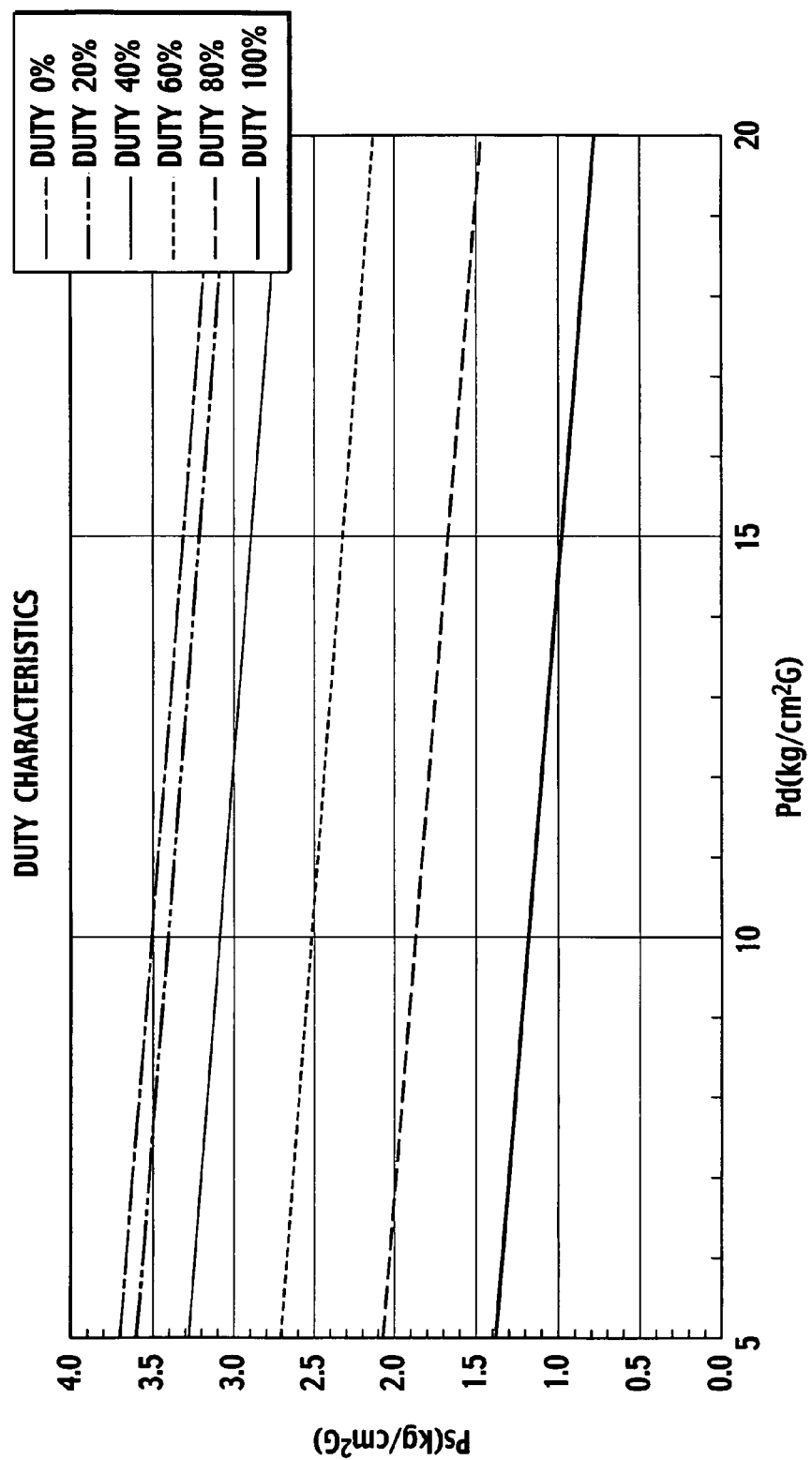
FIG. 5 shows an embodiment of the invention, and is a diagram of characteristics of compressor suction side pressure and compressor discharge side pressure using duty ratio as parameters.

In the variable capacitance compressor 8 of this embodiment, in a state where the electromagnetic coil 35 is not energized (duty ratio=0%), the diaphragm 32 of the control valve 13 and the set spring 33 are set such that the compressor discharge side pressure Pd and the compressor suction side pressure Ps have a relation shown in the duty=0% diagram (a dashed line) in FIG. 5.

For example, in a state where the compressor suction side pressure is very high (e.g., 5 kg/cm$^2$G), as shown in FIG. 3, 5 kg/cm$^2$G pressure is applied to the diaphragm 32, and the control body 28 and the high pressure ball 31 are pushed down and it is fully closed. Since the crankcase 30 is in communication with a suction chamber 50 through a communication passage 54, the pressure in the crankcase 30 becomes low, i.e., the pressure becomes equal to the compressor suction side pressure Ps, and the stroke amount of the piston 27 becomes maximum, i.e., the capacity of the variable capacitance compressor 8 becomes maximum.

The compressor suction side pressure is then gradually lowered, and if the compressor suction side pressure comes close to the duty=0% diagram, the pressure acting on the diaphragm 32 is also lowered, and the push-down amounts of the control body 28 and the high pressure ball 31 are reduced. Thus, the amount of refrigerant flowing into the crankcase 30 is reduced. The rising rate of the pressure acting on the back surface of the piston 27 is then reduced, the stroke amount of the piston 27 is reduced, the capacity is controlled, and the compressor suction side pressure is stabilized when the duty=0%.

If the air conditioner control unit 14 outputs a control pulse signal to the control valve 13 to bring the duty ratio to 60%, the variable capacitance compressor 8 is controlled such that a relation of the compressor discharge side pressure Pd and the compressor suction side pressure Ps of duty=60% (short broken line) is established.

For example, the electromagnetic coil 35 is energized but in a state where the compressor suction side pressure is very high (e.g., 5 kg/cm$^2$G), press of 5 kg/cm$^2$G is applied to the diaphragm 32, and as explained above, the stroke amount of the piston 27 becomes maximum, and the capacity of the variable capacitance compressor 8 becomes maximum.

If the compressor suction side pressure is gradually lowered and approaches duty=60% diagram, the pressure acting on the diaphragm 32 is also lowered and the pushing amounts of the control body 28 and the high pressure ball 31 are reduced. Thus, the amount of refrigerant flowing into the crankcase 30 is reduced. The rising ratio of pressure acting on the back surface of the piston 27 is then reduced, the stroke amount of the piston 27 is reduced, the capacity is controlled, and the compressor suction side pressure is stabilized at duty=60% or higher.

The reason why the torque of the variable capacitance compressor 8 can be calculated from the evaporator upstream and downstream temperature difference data which is a temperature difference between the inlet side air temperature of the evaporator 12 and the outlet side air temperature of the evaporator 12, the compressor discharge side pressure data, the duty ratio data which is an external control signal for controlling the control valve 13, and the compressor's number of revolution data will be explained next.

The following equation (1) is one of theoretical equations for obtaining torque Tc of the variable capacitance compressor 8:

$$Tc=(i1-i2)\times Gr\times \eta m/Nc \quad (1)$$

wherein, i1 represents compressor discharge refrigerant enthalpy, i2 represents compressor suction refrigerant enthalpy, Gr represents refrigerant flow rate, Tim represents compressor machine efficiency, and Nc represents compressor's number of revolutions.

Figure 4:
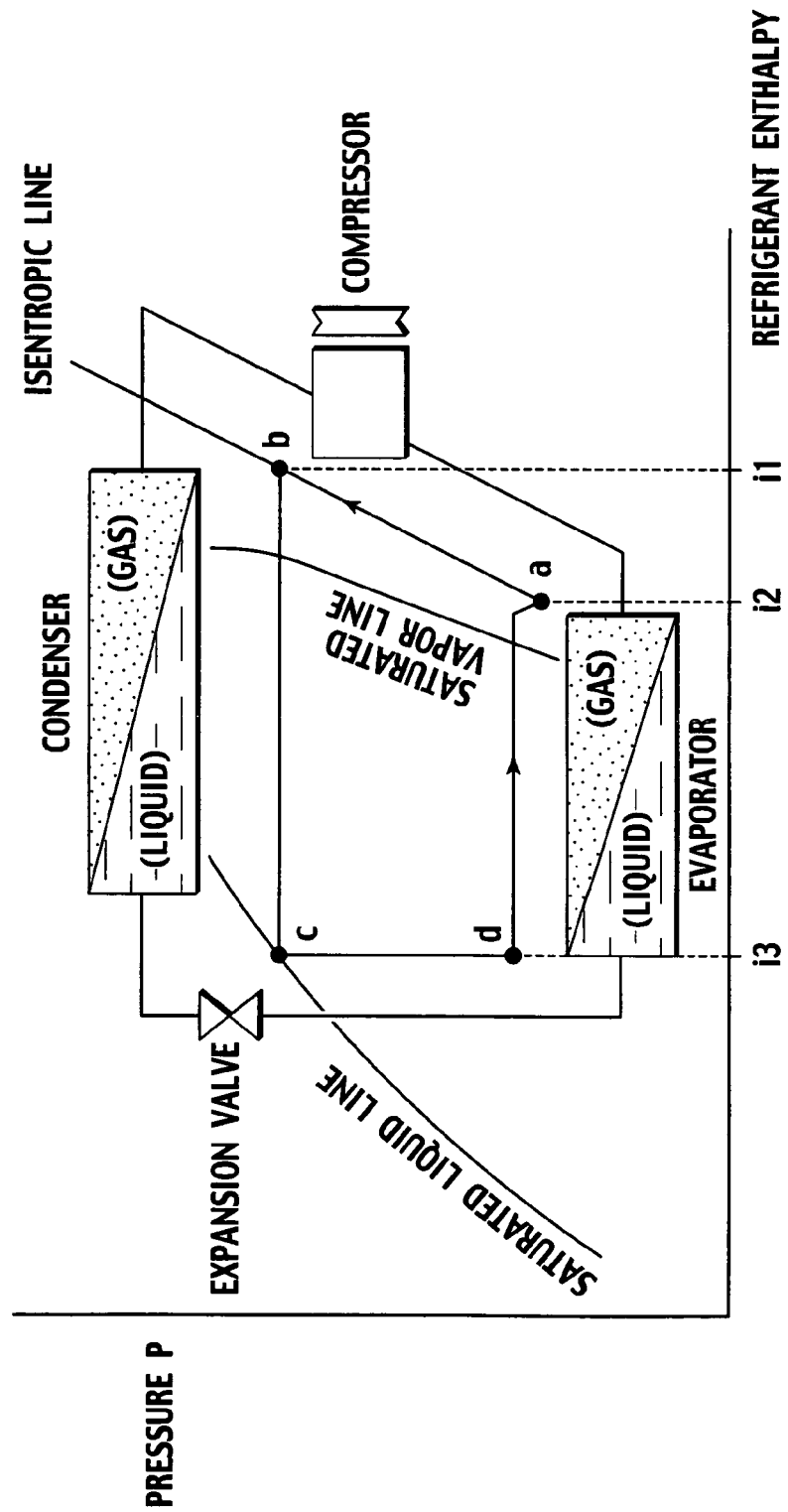
FIG. 4 shows an embodiment of the invention, and is a diagram of a Mollier diagram and a refrigeration cycle which is described in correspondence with the Mollier diagram.

As shown in FIG. 4, the compressor discharge refrigerant enthalpy i1 can be expressed with a function of i1=f(Pd), and the compressor suction refrigerant enthalpy i2 can be expressed with a function of i2=f(Ps), the equation (1) can be expressed with the following equation (2):

$$Tc=\{f(Pd)-f(Ps)\}\times Gr\times \eta m/Nc \quad (2)$$

In the equation (2), ηm is varied at compressor compression ratio (Pd/Ps) and refrigerant flow rate Gr, and is value specific in compressor model. Since Nc is a known value, the torque can be estimated when the compressor discharge side pressure Pd, the compressor suction side pressure Ps, and the refrigerant flow rate Gr can be read.

The compressor discharge side pressure Pd can be read from the sensor detection value of the refrigerant pressure sensor 21*n*. In this variable capacitance compressor 8, the compressor suction side pressure Ps is controlled by the duty ratio of the control pulse signal to the control valve 13, the compressor suction side pressure Ps can be read from the compressor discharge side pressure Pd and the duty ratio. That is, as shown in FIG. 5, since the compressor suction side pressure Ps and the compressor discharge side pressure Pd show predetermined characteristic line by the duty ratio, the compressor suction side pressure Ps can substantially be specified by the duty ratio which is the external control signal and the compressor discharge side pressure Pd.

Thus, the equation (2) can be expressed with the following equation (3):

$$Tc=\{f(Pd)-f(Pd,\text{ duty ratio})\}\times Gr\times \eta m/Nc \quad (3)$$

The equation (3) can be expressed with the following equation (4):

$$Tc=F1(Pd,\text{ duty ratio})\times Gr\times \eta m/Nc \quad (4)$$

Figure 6:
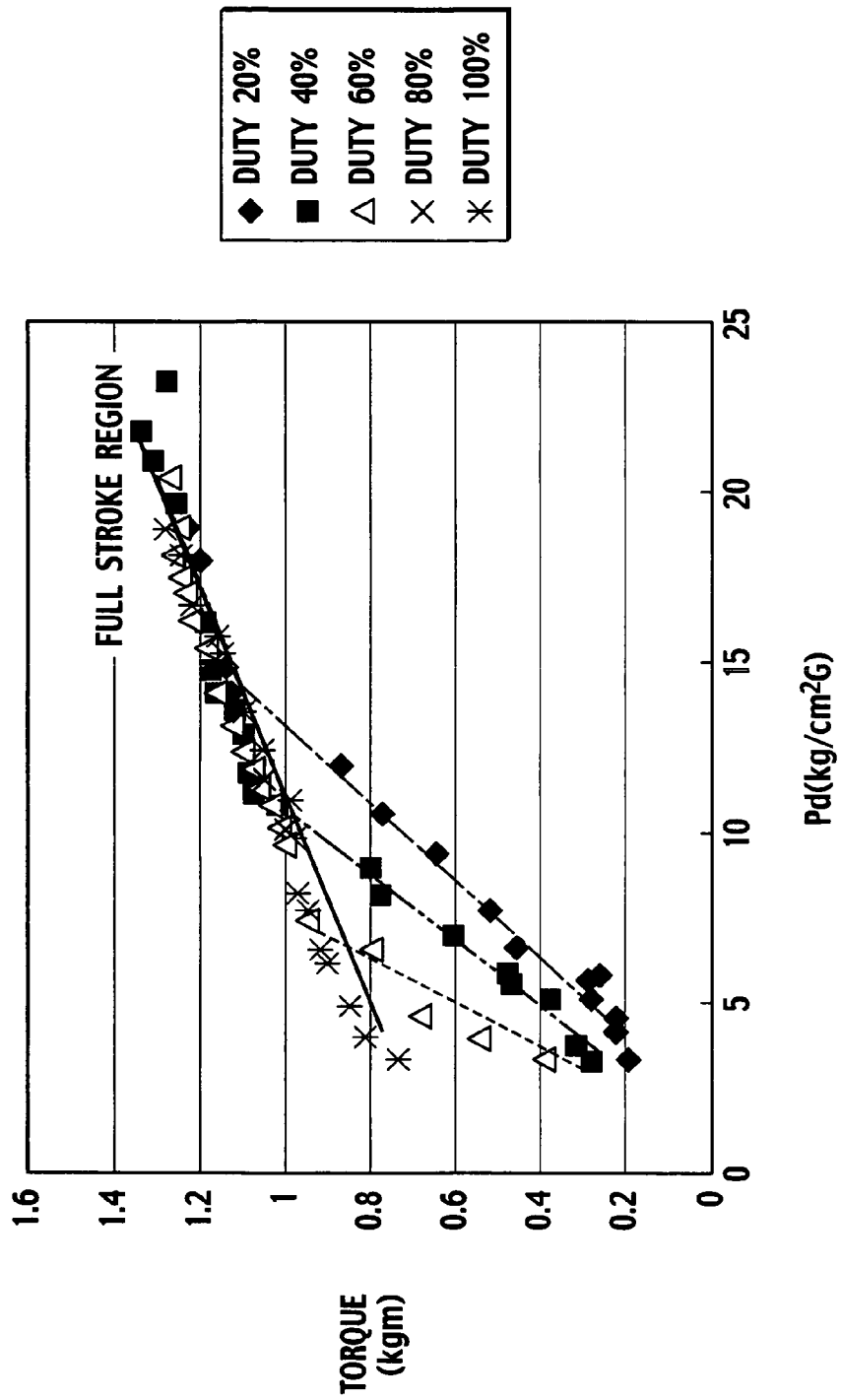
FIG. 6 shows an embodiment of the invention, and shows characteristics of compressor discharge side pressure and torque using duty ratio as parameters when a refrigeration cycle load (evaporator load) is made constant.

The variables in the equation (4) are narrowed down next. FIG. 6 shows a correlation between the compressor discharge side pressure Pd and the torque Tc using, as parameter, a duty ratio when the refrigeration cycle load (suction load of the evaporator) is constant (25° C., moisture of 50%, air-blow amount (blower voltage 5V)). From FIG. 6, it can be conceived that the torque Tc can sufficiently be estimated from the compressor discharge side pressure Pd and the duty ratio on the basis of the duty ratio.

Thus, if the refrigeration cycle load (suction load of the evaporator) is constant, Gr is expressed as a function of f1(Pd, Ps), and ηm is expressed as a function of f2(Pd, Pd). Thus, the equation (4) can be expressed with the following equation (5):

$$Tc=F(Pd,\text{ duty ratio})/Nc \quad (5)$$

Figure 7:
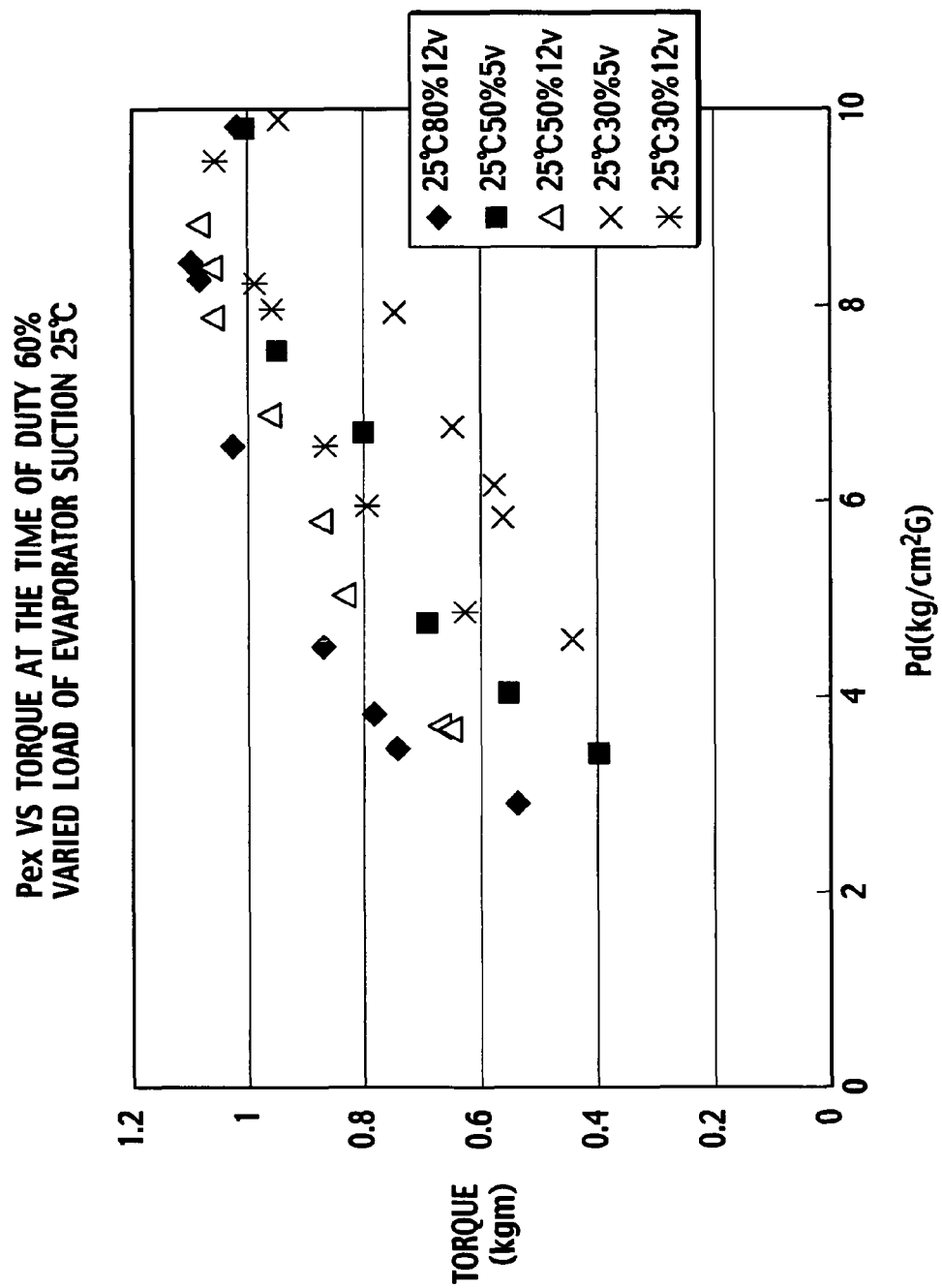
FIG. 7 shows an embodiment of the invention, and shows characteristics of compressor discharge side pressure and torque when the refrigeration cycle load (evaporator load) is varied.

It will be verified what torque variation occurs when the refrigeration cycle load (suction load of the evaporator) is varied. If the suction temperature of the evaporator 12 is set constant, i.e., 25° C. and the moisture and the air-blow amount (voltage to the blower fan motor 19) are varied, there is a correlation between the compressor discharge side pressure Pd and the torque Tc as shown in FIG. 7. That is, when torque in a variable region is different and the refrigeration cycle load (suction load of the evaporator) is varied, the refrigerant flow rate Gr is varied. Thus, an element which estimates the refrigerant flow rate Gr is necessary, and this element is checked by the following equation of cooling performance by the evaporator load.

If the evaporator refrigerant heat absorption amount is defined as Qevap and the evaporator inlet side refrigerant enthalpy is defined as i3 and the evaporator outlet side enthalpy is defined as i2 (since it is the same as the compressor suction side enthalpy, the same symbol is used)

$$Qevap=(i3-i2)\times Gr \quad (6)$$

thus, $Gr=Qevap/(i3-i2) \quad (7)$

The evaporator air heat absorption amount Qevap (air) can be expressed with the following equation:

Qevap(air)={(evaporator upstream evaporator upstream air heat absorption amount)−(evaporator downstream air heat absorption amount)}× (evaporator air-blow amount)/(air ratio capacity)

The evaporator refrigerant heat absorption amount Qevap has the same value as that of the evaporator air heat absorption amount Qevap (air), and is proportional to a temperature difference between the evaporator inlet side air temperature and the outlet side air temperature. Thus, the evaporator refrigerant heat absorption amount Qevap can be estimated by reading the evaporator upstream and downstream temperature difference (Δt). Thus, it can be expressed with a function of Qevap=f(Δt).

As shown in FIG. 4, since the evaporator inlet side enthalpy i3 and the evaporator outlet side enthalpy i2 can be expressed with functions of i3=f(Pd) and i2=f(Ps), respectively, the equation (7) can be expressed with the following equation (8):

$$Gr=f3(\Delta t)/f4(Pd)-f(Pd,\text{ duty ratio}) \quad (8)$$

Since the denominator of the equation (8) is function of Pd and duty ratio, the equation can be deformed as the following equation (9):

$$Gr=f3(\Delta t)/F2(Pd,\text{ duty ratio}) \quad (9)$$

From the equations (9) and (4), the torque Tc can be expressed with the following equation (10):

$$Tc=F1(Pd,\text{ duty ratio})\times \{f3(\Delta t)/F2(Pd,\text{ duty ratio})\}/Nc \quad (10)$$

The equation (10) can be deformed as the following equation (11):

$$Tc=f(\Delta t)/f(Pd,\text{ duty ratio})/Nc \quad (11)$$

Figure 8:
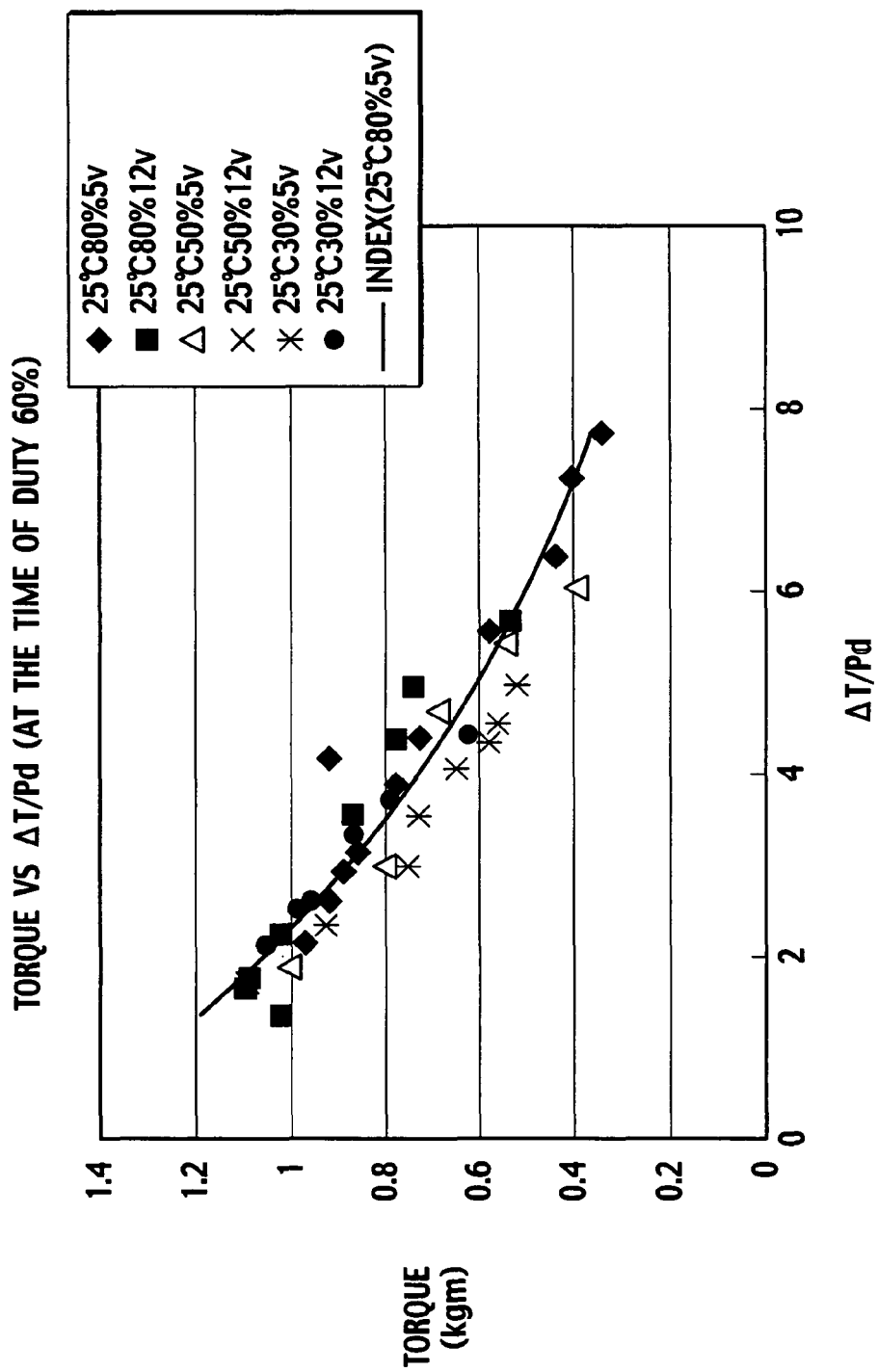
FIG. 8 shows an embodiment of the invention, and shows characteristics of torque and compressor discharge side pressure when the duty ratio is made constant (60%)

From the torque calculation equation (11), the relation between Δt/Pd and torque Tc can be expressed in a graph shown in FIG. 8. From FIG. 8, a difference of evaporator load (suction moisture, air-blow amount) can be absorbed. From the above reason, the torque Tc of the variable capacitance compressor 8 can be calculated from the evaporator upstream and downstream temperature difference Δt which is a temperature difference between the inlet side air temperature of the evaporator 12 and the outlet side air temperature of the evaporator 12, the compressor discharge side pressure Pd, the duty ratio data for controlling the control valve 13, and the compressor's number Nc of revolutions.

In this embodiment, in order to easily calculate the torque Tc of the variable capacitance compressor 8 at the time of idling, deceleration, fuel cut and the like, a constant value (normal number of revolution value at the time of idling, deceleration, and fuel cut) is used as the number Nc of revolutions of the compressor in the equation (11), and the following torque calculation equation (12) is used. In the equation (12), the evaporator upstream and downstream temperature difference Δt and the compressor discharge side pressure Pd are defined as variable terms, data values determined based on measured values using an actual vehicle according to the duty ratio and the evaporator upstream and downstream temperature difference Δt are determined as constant terms A and B.

$$Tc = A \times LN(Pd/\Delta t) + B \quad (12)$$

The compressor torque calculator 14c stores data values of the constant terms A and B obtained by the torque calculation equation (12) and measurement under various conditions into an external or internal memory (not shown), inputs data corresponding the variable term and constant term of the torque calculation equation (12) to carry out calculation, thereby calculating the torque.

Figure 9:
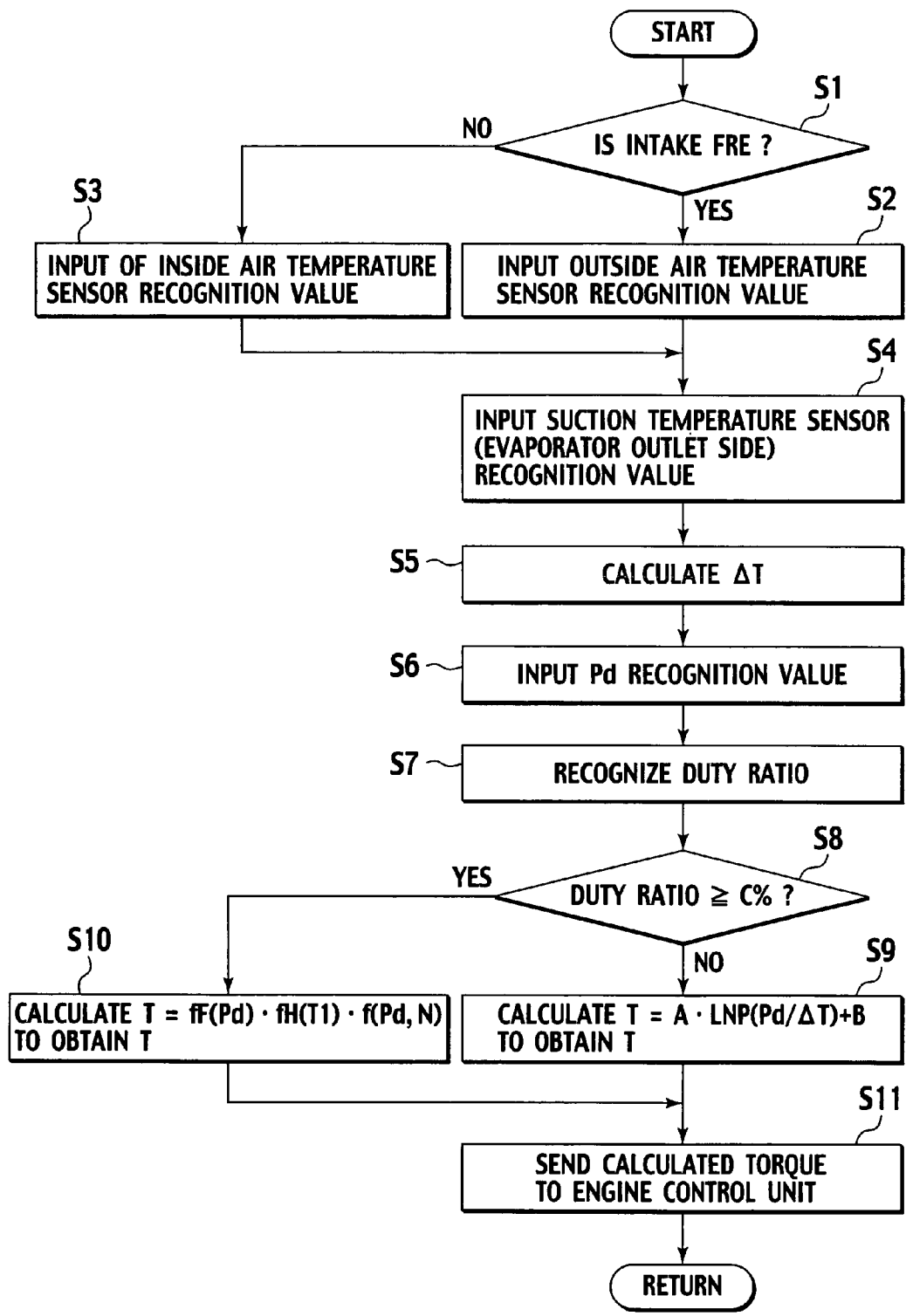
FIG. 9 shows an embodiment of the invention, and is a flowchart of torque calculation processing.
Figure 10:
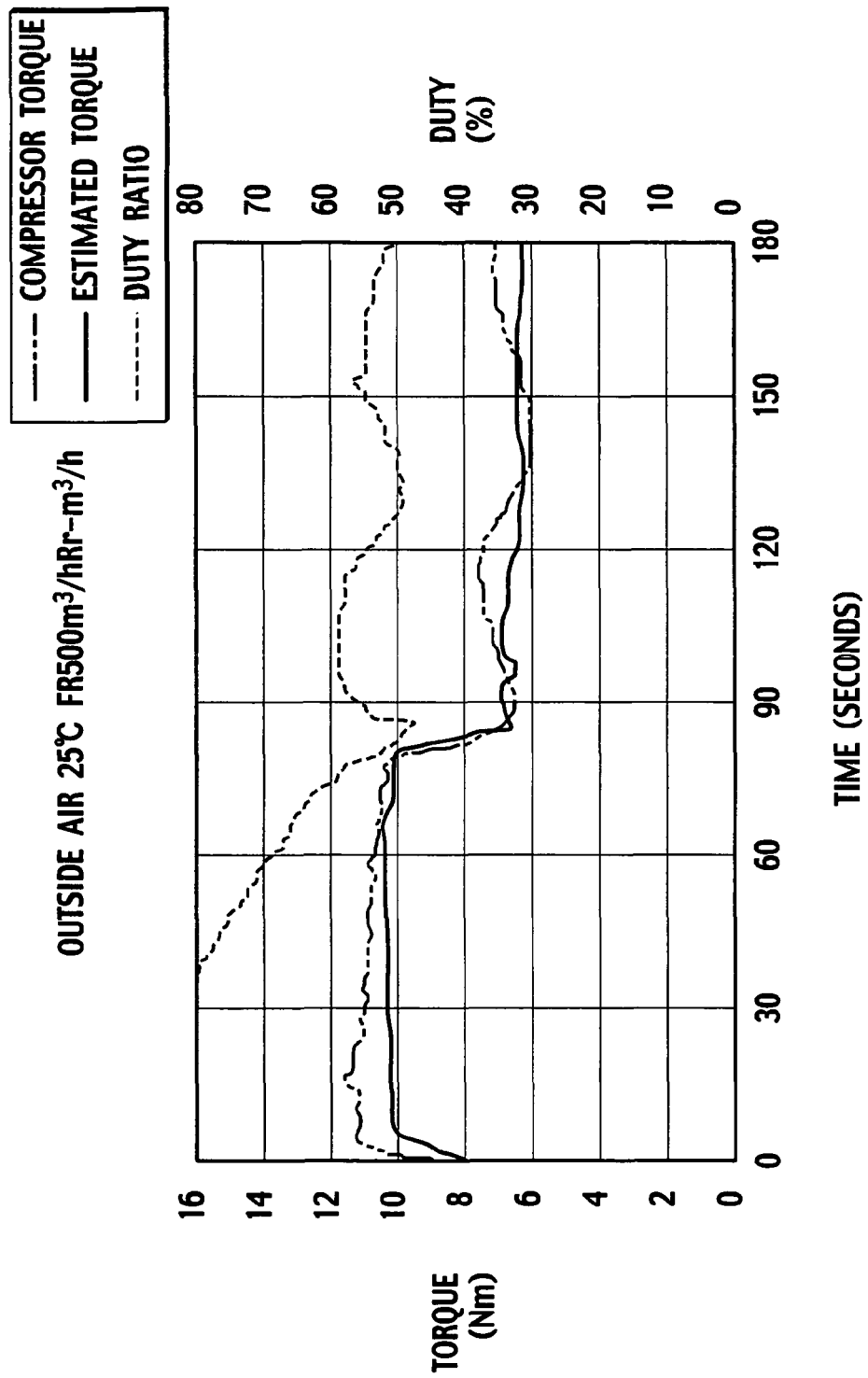
FIG. 10 shows an embodiment of the invention, and is a diagram of characteristics of estimated torque and actual torque.

Torque calculation processing of the variable capacitance compressor 8 at the time of idling, deceleration, and fuel cut will be explained next, with reference to the flowchart in FIG. 9. As shown in FIG. 9, it is determined whether an intake door (not shown) is in an outside air introduction position or an inside air circulation position (step S1). If the intake door is in the outside air introduction position, detection temperature of the outside air temperature sensor 21j is taken in as evaporator inlet side air temperature, and outside air temperature sensor recognition value obtained by delaying and correcting this detection data is input to the compressor torque calculator 14c (step S2). If the intake door is in the inside air circulation position, detection temperature of the inside air temperature sensor 21i is taken in as evaporator inlet side air temperature, and inside air temperature sensor recognition value obtained by delaying and correcting the detection data is input to the compressor torque calculator 14c (step S3).

Detection temperature of a suction temperature sensor 21l which is the evaporator outlet side air temperature is taken in, and suction temperature sensor recognition value obtained by delaying and correcting the detection data is input to the compressor torque calculator 14c (step S4).

Evaporator upstream and downstream temperature difference data Δt is then calculated by the data (step S5) That is, when outside air is introduced, suction temperature sensor recognition value is subtracted from the outside air temperature sensor recognition value, and when inside air is circulated, suction temperature sensor recognition value is subtracted from the inside air temperature sensor recognition value to calculate the evaporator upstream and downstream temperature difference data Δt.

Detection pressure of the refrigerant pressure sensor 21n is taken in, and compressor discharge side pressure recognition value obtained by delaying and correcting the detection data is input to the compressor torque calculator 14c (step S6).

Duty ratio of a control pulse signal sent from the compressor capacity controller 14b to the control valve 13 is input to the compressor torque calculator 14c (step 7).

The compressor torque calculator 14c then determines whether the input duty ratio is greater than a predetermined value C (step S8). If the input duty ratio is smaller than the predetermined value, it is determined that the capacity is controlled, the obtained data is input to the torque calculation equation (12), the calculation is carried out, thereby calculating the torque (step S9). The calculated torque is then sent to the engine control unit 3 (step S11). By repeating the above processing, the torque of the variable capacitance compressor 8 is calculated in real time. The engine control unit 3 controls the suction air amount (fuel supply amount) to prevent engine stalls and idling of the engine in an idling mode, for example.

When the input duty ratio is equal to or higher than the predetermined value C, the compressor torque calculator 14c determined that the state is a later-described maximum capacity control state, input the obtained data to a later-described torque calculation equation (13) to carry out the calculation, thereby calculating the torque (step S10). The calculated torque is then sent to the engine control unit 3 (step S11).

The variable capacitance compressor 8 is provided in the refrigeration cycle 7 of the vehicular air conditioning system 6, controls the discharge capacity of the refrigerant by the duty ratio of the control pulse signal, and can substantially specify the compressor suction side pressure by the duty ratio of the control pulse signal and the compressor discharge side pressure. The variable capacitance compressor 8 calculates torque based on the evaporator upstream and downstream temperature difference data Δt which is the temperature difference between the inlet side air temperature of the evaporator 12 and the outlet side air temperature of the evaporator 12, the compressor discharge side pressure Pd, the duty ratio data, and the compressor's number of revolution data Nc. That is, the fact that the compressor suction side pressure Ps can substantially be specified by the duty ratio of the control pulse signal and the compressor discharge side pressure Pd is utilized, and when the suction load of the evaporator as a load of the refrigeration cycle 7 is constant, the refrigerant flow rate Gr and the compressor machine efficiency ηm can be obtained as functions of the duty ratio and the compressor discharge side pressure Pd. When the suction load of the evaporator as a load of the refrigeration cycle 7 is varied, the value of the varied refrigerant flow rate Gr and the evaporator refrigerant heat absorption amount can be estimated from the temperature difference data between the evaporator inlet side air temperature and the evaporator outlet air temperature. Utilizing these relations, the torque is calculated based on the evaporator upstream and downstream temperature difference data Δt, the compressor discharge side pressure Pd, the duty ratio data, and the compressor's number of revolution data Nc. Thus, since the refrigerant flow rate Gr flowing through the evaporator 12 of the refrigeration cycle is taken into consideration, the torque can be calculated with high estimation precision.

The outside air temperature detection value is utilized as the inlet side air temperature of the evaporator 12 in the outside air introduction mode, and the interior temperature detection value is utilized as the inlet side air temperature of the evaporator 12 in the inside air circulation mode. Thus, it is unnecessary to add a new sensor except the existing sensors which are normally provided in the vehicular air conditioning system 6.

Since the constant value is used as the compressor's number of revolution data Nc in this embodiment, when the compressor's number of revolution data Nc is substantially constant with the predetermined number of revolutions as in the idling time, deceleration time, or the fuel cut time, data to be obtained can be reduced, and it becomes easy to calculate the torque calculation equation.

Figure 11:
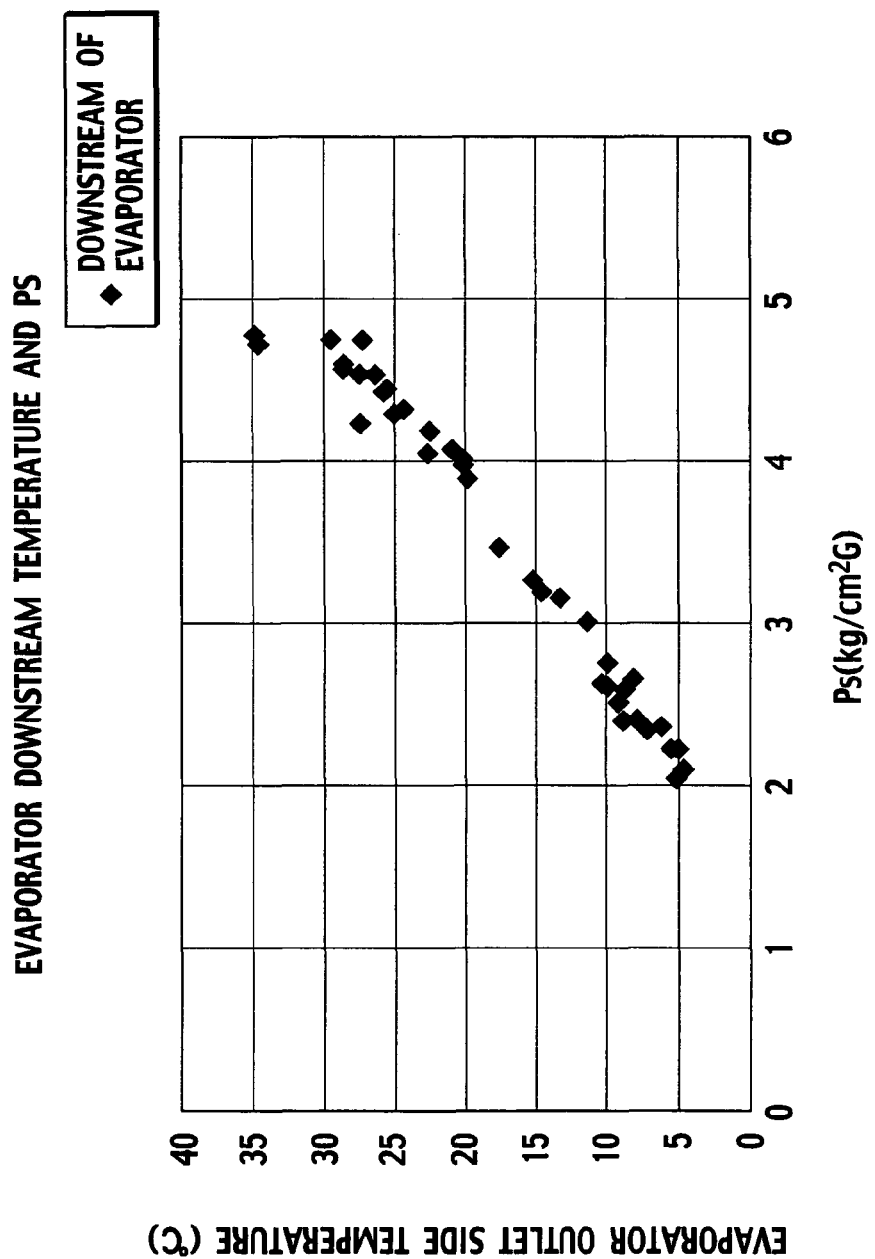
FIG. 11 shows an embodiment of the invention, and is a diagram of characteristics of compressor suction side pressure and evaporator outlet side air temperature.

In this embodiment, the torque calculation equation (12) is stored. In the torque calculation equation (12), portions of the evaporator upstream and downstream temperature difference data Δt, the compressor discharge side pressure data Pd, the duty ratio data and the compressor's number of revolution data Nc are variable terms, and data which is determined based on the data contents is the constant terms A and B. The data values of the constant terms A and B obtained by the measurement under various conditions are stored, data corresponding to the variable term and the constant term of the torque calculation equation (12) is input to carry out the calculation, thereby calculating the torque. Therefore, since it is possible to adjust the data of the constant terms A and B so that a torque close to the actual measurement can be obtained, it is possible to estimate a torque close to the actual torque. FIG. 11 shows characteristic line of the estimated torque calculated according to the embodiment and the actually measured actual torque. As apparent from the characteristic diagram in FIG. 11, an estimated torque close to the actual torque could be obtained. It can be found that even if a load is varied, it is possible to estimate a torque within ±2 Nm.

A modification of the embodiment will be explained. The compressor torque calculator 14c stores the torque calculation equation (11) using, as variables, the evaporator upstream and downstream temperature difference data Δt, the compressor discharge side pressure Pd, the duty ratio, and the compressor's number of revolution data Nc in the external or internal memory (not shown), inputs the obtained data into the torque calculation equation (11) to carry out the calculation, thereby calculating the torque. In the torque calculation processing procedure, the compressor number of revolution data Nc is input in addition to the various data input in the embodiment. With this configuration, the amount of data to be stored in the memory is reduced. Torque during entire operation of the vehicular air conditioning system 6 can be calculated irrespective of the idling state, the decelerating state and the fuel cut state.

A torque calculation equation in which the compressor's number of revolution data Nc in the torque calculation equation (11) is constant (normal number of revolution value at the time of idling, deceleration, and fuel cut) may be stored. With this configuration, when the compressor's number of revolution data Nc is the predetermined number of revolutions and substantially constant, data to be obtained can be reduced, and it becomes easy to calculate the torque calculation equation.

The estimation of torque in the capacity control state has been described above. Estimation of torque in a maximum capacity control state will be explained next. In the maximum capacity control state, since the value of torque is greater than that of the capacity control state, influence of a torque variation on the engine is great and thus, the precision must be further enhanced.

A torque T of the variable capacitance compressor 8 is obtained from the compression ratio, the number of revolutions, volumetric efficiency and suction refrigerant density using a theoretic equation which is different from the equation (1). Among them, the volumetric efficiency is not largely varied during operation and thus, it can be constant. The compression ratio has a correlation to the compressor discharge side pressure Pd and the compressor suction side pressure Ps, and the suction refrigerant density has a correlation to the control pulse signal.

Attention was paid to the compressor suction side pressure Ps and the compressor discharge side pressure Pd, and it was found that the compressor suction side pressure Ps has influence on the suction load of the evaporator 12 and the evaporator-passing air-blow amount. Since these results influenced the evaporator outlet side air temperature, a relation between the evaporator outlet side air temperature and the compressor suction side pressure Ps was checked. It was confirmed that there existed substantially proportional relation therebetween as shown in FIG. 11, and it was found that the compressor suction side pressure Ps could be estimated from the evaporator outlet side air temperature. With this knowledge, torque of full stroke, i.e., torque in the maximum capacity control state can be estimated from the relation between the compressor suction side pressure Ps and the compressor discharge side pressure Pd. Hence, a torque map with respect to the compressor discharge side pressure Pd was obtained based on the evaporator outlet side air temperature while taking the above fact into consideration, and it was found that the data had a correlation based on the evaporator outlet side air temperature as shown in FIG. 12.

The relation between the number of revolutions N and torque T was checked, and it was confirmed that at the same number of revolutions, if the compressor discharge side pressure Pd was increased, the torque T was reduced, and if the number of revolutions N was increased, the torque T was reduced.

Based on the above points, the following torque calculation equation (13) has been derived. T1 in the torque calculation equation (13) represents detected evaporator outlet side air temperature of the suction temperature sensor 21*l*.

$$T(\text{torque}) = fF(\text{compressor discharge side pressure } Pd) \times fH(T1) \times f(\text{compressor discharge side pressure } Pd, N) \quad (13)$$

fF(compressor discharge side pressure Pd) is a torque calculation term which is brought close by torque data at the time of predetermined evaporator outlet side air temperature T1, and is obtained by multiplying correction term fH(T1) which is a variation based on the evaporator outlet side air temperature. f(compressor discharge side pressure Pd, N) is a correction term based on the compressor's number of revolution data N. In the maximum capacity control state, the torque is varied depending on characteristics of the variable capacitance compressor 8 as the number of revolutions is increased. The correction term has been obtained as a variation ratio with respect to the number of revolutions at idling time obtained by the experiment, but if the compressor discharge side pressure Pd is used, the precision is enhanced. If the evaporator outlet side air temperature data is used instead of the compressor suction side pressure Ps, it is possible to precisely estimate a torque in the maximum capacity control state without adding a new sensor for detecting the compressor suction side pressure Ps.

Although the duty ratio of the control pulse signal is used as the external control signal for controlling the discharge capacity of the refrigerant of the variable capacitance compressor 8 from outside in the embodiment, it is possible to use various electric amount, and the invention is not limited to the duty ratio, of course.

Although the variable capacitance compressor 8 driven by the engine is used in the embodiment, the invention can be applied also to a variable capacitance compressor driven by an electric motor, of course.

It is possible to dispose an evaporator inlet side temperature sensor 21*p* on the inlet side of the evaporator 12 and to detect the evaporator inlet side air temperature. In this case, steps S1 to S3 in the flowchart of FIG. 9 are omitted, evaporator inlet side air temperature detected by the evaporator inlet side temperature sensor 21p is input to the compressor torque calculator 14c, and calculations after step S4 are carried out. With the processing of step S4 and further, the same effect as that of the embodiment can be achieved.

This application claims priority from Japanese Patent Application 2004-301773, filed Oct. 15, 2004, and Japanese Patent Application 2005-153110, filed May 25, 2005, which are incorporated herein by reference in their entirety.

What is claimed is:

1. A torque calculation apparatus of a variable capacitance compressor which is provided in a refrigeration cycle of a vehicular air conditioning system, which controls discharge capacity of refrigerant based on an external control signal, and which can estimate compressor suction side pressure based on the external control signal and compressor discharge side pressure, the torque calculation apparatus comprising:

a compressor torque calculator which calculates a torque of the variable capacitance compressor based on evaporator upstream and downstream temperature difference data which is a temperature difference between inlet side air temperature of an evaporator and outlet side air temperature of the evaporator, compressor discharge side pressure data, external control signal data, and compressor's number of revolution data;

an outside air temperature detector which detects temperature of outside air;

an inside air temperature detector which detects temperature in a passenger room; and a memory which stores a torque calculation equation in which at least one of the evaporator upstream and downstream temperature difference data, the compressor discharge side pressure data, the external control signal data, and the compressor's number of revolution data is defined as a variable, and other data is defined as a constant value that is determined based on measurements under various conditions, wherein the compressor torque calculator defines the outside air temperature detected by the outside air temperature detector as the inlet side air temperature of the evaporator in an outside air introduction mode, and defines the passenger room temperature detected by the inside air temperature detector as the inlet side air temperature of the evaporator in an inside air circulation mode, each of the data defined as the variable and the constant value is input to the torque calculation equation to carry out calculation for calculating the torque, and the torque calculation equation is $Tc = A \cdot LN(Pd/\Delta t) + B$, wherein Tc represents the torque of the variable capacitance compressor, $\Delta t$ represents the evaporator upstream and downstream temperature difference data, Pd represents the compressor discharge side pressure data, the compressor's number of revolution data is defined as the constant value, LN represents logarithm natural, and A and B represent values determined based on the external control signal data and the evaporator upstream and downstream temperature difference data, the external control signal is a duty ratio for controlling an open/close duty ratio of a control valve of the variable capacitance compressor, and the constant value is determined based on measurements under various conditions of the duty ratio and the evaporator upstream and downstream temperature difference data.

2. The torque calculation apparatus of the variable capacitance compressor according to claim 1, wherein the compressor's number of revolution data is defined as a constant value.

3. The torque calculation apparatus of the variable capacitance compressor according to claim 1, further comprising:

a memory which stores a torque calculation equation in which the evaporator upstream and downstream temperature difference data, the compressor discharge side pressure data and the external control signal data are defined as variables, and the compressor's number of revolution data is defined as a variable or a constant value, wherein each of the data is input to the torque calculation equation to carry out calculations for calculating the torque.

4. The torque calculation apparatus of the variable capacitance compressor according to claim 1, further comprising:

a determining unit which determines whether the variable capacitance compressor is in a maximum capacity control state, wherein the compressor torque calculator calculates, when the determining unit determines that the variable capacitance compressor is in the maximum capacity control state, the torque based on the compressor discharge side pressure data, the compressor's number of revolution data, and evaporator outlet side air temperature data.

* * * * *